United States Patent
Dolga et al.

(10) Patent No.: US 11,977,439 B2
(45) Date of Patent: May 7, 2024

(54) METHOD AND SYSTEM FOR ACTIONABLE SMART MONITORING OF ERROR MESSAGES

(71) Applicant: JPMorgan Chase Bank, N.A., New York, NY (US)

(72) Inventors: Rares Dolga, London (GB); Salwa Husam Alamir, Bournemouth (GB); Sameena Shah, Scarsdale, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/953,944

(22) Filed: Sep. 27, 2022

(65) Prior Publication Data

US 2024/0103955 A1   Mar. 28, 2024

(51) Int. Cl.
  *G06F 11/00* (2006.01)
  *G06F 9/451* (2018.01)
  *G06F 11/07* (2006.01)

(52) U.S. Cl.
  CPC .......... *G06F 11/0784* (2013.01); *G06F 9/451* (2018.02); *G06F 11/079* (2013.01)

(58) Field of Classification Search
  CPC ..... G06F 11/0784; G06F 11/079; G06F 9/451
  USPC ...................................................... 714/1–57
  See application file for complete search history.

(56) References Cited

U.S. PATENT DOCUMENTS

| | | | | |
|---|---|---|---|---|
| 2010/0185903 | A1* | 7/2010 | Horn | G06F 11/004 706/47 |
| 2015/0261649 | A1* | 9/2015 | Boehm | G06F 11/3466 714/47.3 |
| 2016/0092290 | A1* | 3/2016 | Gerstl | G06F 11/0787 714/37 |
| 2016/0092781 | A1* | 3/2016 | Byrnes | G06Q 30/0631 706/52 |
| 2020/0112497 | A1* | 4/2020 | Yenumulapalli | H04L 43/10 |
| 2021/0216542 | A1* | 7/2021 | Bala | G06F 16/906 |
| 2021/0365344 | A1* | 11/2021 | Bui | G06F 17/18 |
| 2023/0021373 | A1* | 1/2023 | Kabbinale | G06F 18/24 |

* cited by examiner

*Primary Examiner* — Sarai E Butler
(74) *Attorney, Agent, or Firm* — Greenblum & Bernstein, P.L.C.

(57) ABSTRACT

A method and a system for providing actionable smart monitoring of error messages generated during repave microservice operations in order to reduce the number of human interventions required are provided. The method includes: receiving reports that relate to system failures; analyzing each report to determine features that relate to the system failures; clustering the features into a set of feature groups; determining a corresponding report as a representative error indicator for each respective feature group; and generating, for each respective feature group, a cluster representative message that identifies the corresponding report. The cluster representative messages are then displayable on a user interface to facilitate efficient user action to address system failures and errors.

13 Claims, 5 Drawing Sheets

METHOD AND SYSTEM FOR ACTIONABLE SMART MONITORING OF ERROR MESSAGES

BACKGROUND

1. Field of the Disclosure

This technology generally relates to methods and systems for monitoring system failures and errors, and more particularly to methods and systems for providing actionable smart monitoring of error messages generated during repave microservice operations in order to reduce the number of human interventions required.

2. Background Information

Repave microservices automate the deployment and setup of software, such as databases on development, testing, and production platforms within large software suites. Such microservices occasionally generate errors and/or experience failures, and in these instances, human interventions may be required in order to remedy the error or overcome the failure.

Conventional monitoring systems provide an overview of the error rate and the failure rate. However, in order to address the errors and failures, an understanding of the underlying causes thereof is necessary.

Accordingly, there is a need for a method for providing actionable smart monitoring of error messages generated during repave microservice operations in order to reduce the number of human interventions required.

SUMMARY

The present disclosure, through one or more of its various aspects, embodiments, and/or specific features or sub-components, provides, inter alia, various systems, servers, devices, methods, media, programs, and platforms for providing actionable smart monitoring of error messages generated during repave microservice operations in order to reduce the number of human interventions required.

According to an aspect of the present disclosure, a method for monitoring system failures is provided. The method is implemented by at least one processor. The method includes: receiving, by the at least one processor, a plurality of reports that relate to system failures; analyzing, by the at least one processor, each report from among the plurality of reports to determine a plurality of features that relate to the system failures; clustering, by the at least one processor, the plurality of features into a set of feature groups; determining, by the at least one processor for each respective feature group, a corresponding report from among the plurality of reports as a representative error indicator for the respective feature group; and generating, by the at least one processor for each respective feature group, a corresponding cluster representative message that identifies the corresponding report, and transmitting the corresponding cluster representative message to a predetermined destination.

The analyzing may include applying a Latent Dirichlet Allocation (LDA) technique to each report in order to determine the plurality of features.

The clustering may include applying a clustering algorithm that implements a machine learning technique to assess similarities among the plurality of features and to assign each respective feature to a corresponding feature group based on the assessed similarities.

The clustering algorithm may include a Gaussian Mixture Model (GMM).

The clustering algorithm may be trained by using historical information that relates to a first set of system failures. The clustering algorithm may be periodically retrained by using additional historical information that relates to a subsequent set of system failures that occur after the first set of system failures.

The determining of the corresponding report as the representative error indicator for the respective feature group may include: calculating a matrix of Levenshtein distances among features included in the respective feature group; and selecting the corresponding report based on the calculated matrix.

The transmitting of the corresponding cluster representative message to the predetermined destination may include displaying the representative message via a graphical user interface (GUI).

The method my further include: determining at least one event sequence associated with a particular system failure associated with at least one report from among the plurality of reports; determining, based on the at least one event sequence, at least one microservice as a candidate for being a source of the particular system failure; and generating at least one metric that includes information that relates to an estimated cost of a human intervention associated with the at least one microservice.

The method may further include displaying the at least one metric via the GUI.

According to another exemplary embodiment, a computing apparatus for monitoring system failures is provided. The computing apparatus includes a processor; a memory; a display; and a communication interface coupled to each of the processor, the memory, and the display. The processor is configured to: receive, via the communication interface, a plurality of reports that relate to system failures; analyze each report from among the plurality of reports to determine a plurality of features that relate to the system failures; cluster the plurality of features into a set of feature groups; determine, for each respective feature group, a corresponding report from among the plurality of reports as a representative error indicator for the respective feature group; and generate, for each respective feature group, a corresponding cluster representative message that identifies the corresponding report, and transmit the corresponding cluster representative message via the communication interface to a predetermined destination.

The processor may be further configured to apply a Latent Dirichlet Allocation (LDA) technique to each report in order to determine the plurality of features.

The processor may be further configured to perform the clustering by applying a clustering algorithm that implements a machine learning technique to assess similarities among the plurality of features and to assign each respective feature to a corresponding feature group based on the assessed similarities.

The clustering algorithm may include a Gaussian Mixture Model (GMM).

The clustering algorithm may be trained by using historical information that relates to a first set of system failures. The clustering algorithm may be periodically retrained by using additional historical information that relates to a subsequent set of system failures that occur after the first set of system failures.

The processor may be further configured to perform the determination of the corresponding report as the representative error indicator for the respective feature group by:

calculating a matrix of Levenshtein distances among features included in the respective feature group; and selecting the corresponding report based on the calculated matrix.

The processor may be further configured to cause the display to display the representative message via a graphical user interface (GUI).

The processor may be further configured to: determine at least one event sequence associated with a particular system failure associated with at least one report from among the plurality of reports; determine, based on the at least one event sequence, at least one microservice as a candidate for being a source of the particular system failure; and generate at least one metric that includes information that relates to an estimated cost of a human intervention associated with the at least one microservice.

The processor may be further configured to cause the display to display the at least one metric via the GUI.

According to yet another exemplary embodiment, a non-transitory computer readable storage medium storing instructions for monitoring system failures is provided. The storage medium includes executable code which, when executed by a processor, causes the processor to: receive a plurality of reports that relate to system failures; analyze each report from among the plurality of reports to determine a plurality of features that relate to the system failures; cluster the plurality of features into a set of feature groups; determine, for each respective feature group, a corresponding report from among the plurality of reports as a representative error indicator for the respective feature group; and generate, for each respective feature group, a corresponding cluster representative message that identifies the corresponding report, and transmit the corresponding cluster representative message to a predetermined destination.

When executed by the processor, the executable code may be further configured to perform the analysis by applying a Latent Dirichlet Allocation (LDA) technique to each report in order to determine the plurality of features.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
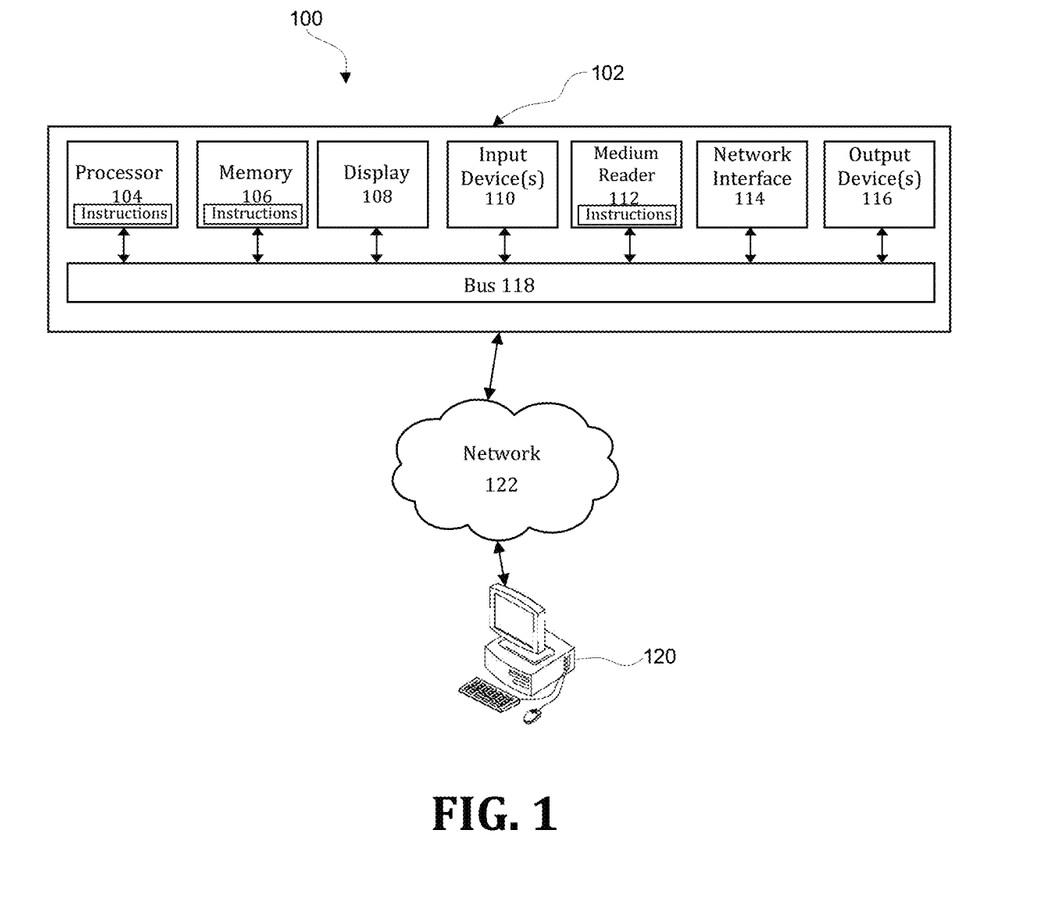
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing actionable smart monitoring of error messages generated during repave microservice operations in order to reduce the number of human interventions required.

Figure 2:
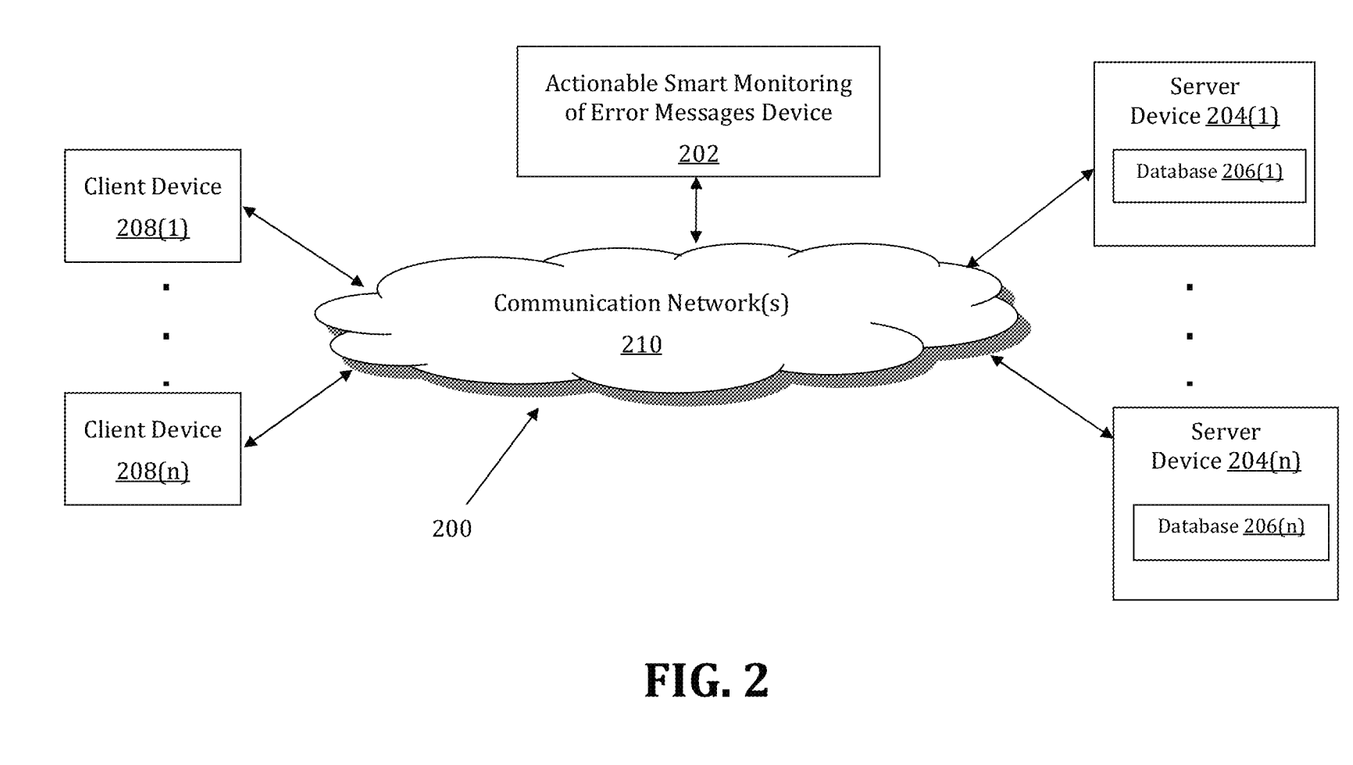
FIG. 2 illustrates an exemplary diagram of a network environment.

Referring to FIG. 2, a schematic of an exemplary network environment 200 for implementing a method for providing actionable smart monitoring of error messages generated during repave microservice operations in order to reduce the number of human interventions required is illustrated. In an exemplary embodiment, the method is executable on any networked computer platform, such as, for example, a personal computer (PC).

The method for providing actionable smart monitoring of error messages generated during repave microservice operations in order to reduce the number of human interventions required may be implemented by an Actionable Smart Monitoring of Error Messages (ASMEM) device 202. The ASMEM device 202 may be the same or similar to the computer system 102 as described with respect to FIG. 1. The ASMEM device 202 may store one or more applications that can include executable instructions that, when executed by the ASMEM device 202, cause the ASMEM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ASMEM device 202 itself, may be located in virtual server(s) running in a cloud-based computing environment rather than being tied to one or more specific physical network computing devices. Also, the application(s) may be running in one or more virtual machines (VMs) executing on the ASMEM device 202. Additionally, in one or more embodiments of this technology, virtual machine(s) running on the ASMEM device 202 may be managed or supervised by a hypervisor.

In the network environment 200 of FIG. 2, the ASMEM device 202 is coupled to a plurality of server devices 204(1)-204(n) that hosts a plurality of databases 206(1)-206(n), and also to a plurality of client devices 208(1)-208(n) via communication network(s) 210. A communication interface of the ASMEM device 202, such as the network interface 114 of the computer system 102 of FIG. 1, operatively couples and communicates between the ASMEM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ASMEM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and ASMEM devices that efficiently implement a method for providing actionable smart monitoring of error messages generated during repave microservice operations in order to reduce the number of human interventions required.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ASMEM device 202 may be a standalone device or integrated with one or more other devices or apparatuses, such as one or more of the server devices 204(1)-204(n), for example. In one particular example, the ASMEM device 202 may include or be hosted by one of the server devices 204(1)-204(n), and other arrangements are also possible. Moreover, one or more of the devices of the ASMEM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the ASMEM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store information that relates to repave microservices and information that relates to statistics and analytical metrics that relate to system failures and errors.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204

(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the ASMEM device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the ASMEM device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the ASMEM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ASMEM device 202, the server devices 204(1)-204(n), or the client devices 208(1)-208(n), for example, may be configured to operate as virtual instances on the same physical machine. In other words, one or more of the ASMEM device 202, the server devices 204(1)-204(n), or the client devices 208(1)-208(n) may operate on the same physical device rather than as separate devices communicating through communication network(s) 210. Additionally, there may be more or fewer ASMEM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
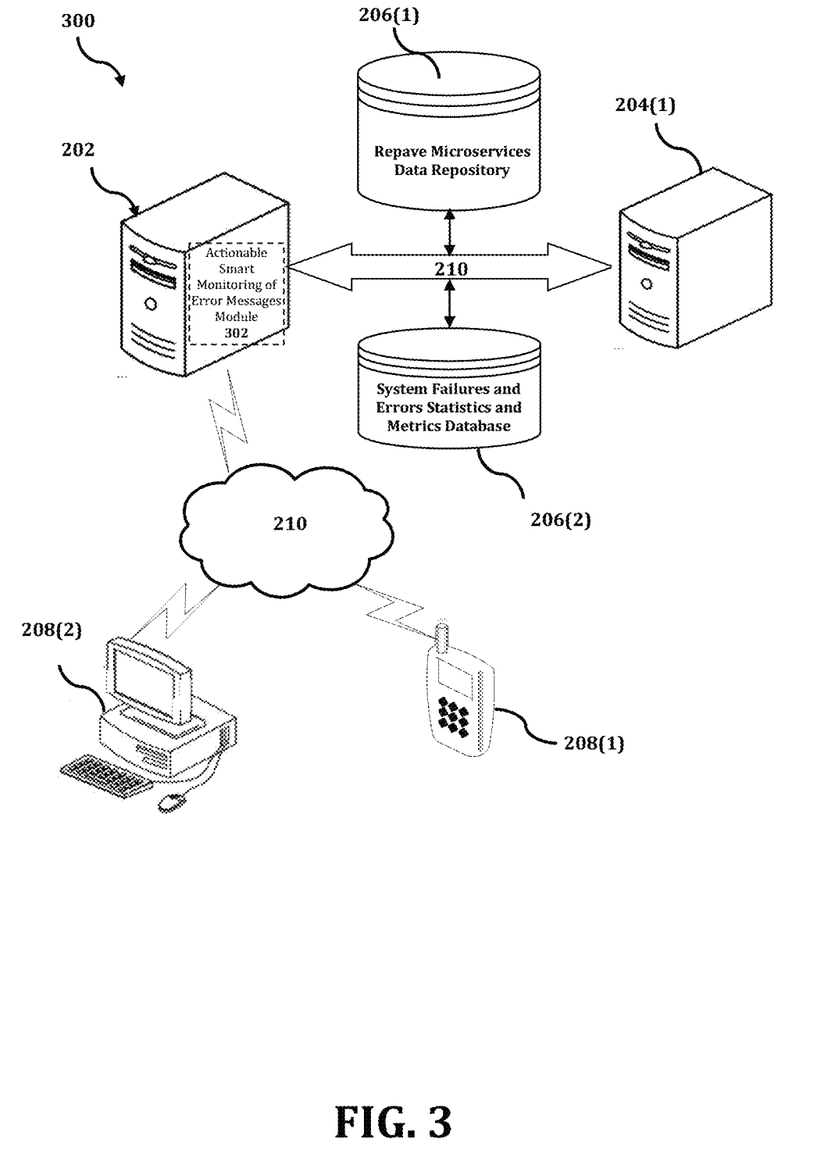
FIG. 3 shows an exemplary system for implementing a method for providing actionable smart monitoring of error messages generated during repave microservice operations in order to reduce the number of human interventions required.

The ASMEM device 202 is described and illustrated in FIG. 3 as including an actionable smart monitoring of error messages module 302, although it may include other rules, policies, modules, databases, or applications, for example. As will be described below, the actionable smart monitoring of error messages module 302 is configured to implement a method for providing actionable smart monitoring of error messages generated during repave microservice operations in order to reduce the number of human interventions required.

An exemplary process 300 for implementing a mechanism for providing actionable smart monitoring of error messages generated during repave microservice operations in order to reduce the number of human interventions required by utilizing the network environment of FIG. 2 is illustrated as being executed in FIG. 3. Specifically, a first client device 208(1) and a second client device 208(2) are illustrated as being in communication with ASMEM device 202. In this regard, the first client device 208(1) and the second client device 208(2) may be "clients" of the ASMEM device 202 and are described herein as such. Nevertheless, it is to be known and understood that the first client device 208(1) and/or the second client device 208(2) need not necessarily be "clients" of the ASMEM device 202, or any entity described in association therewith herein. Any additional or alternative relationship may exist between either or both of the first client device 208(1) and the second client device 208(2) and the ASMEM device 202, or no relationship may exist.

Further, ASMEM device 202 is illustrated as being able to access a repave microservices data repository 206(1) and a system failures and errors statistics and metrics database 206(2). The actionable smart monitoring of error messages module 302 may be configured to access these databases for implementing a method for providing actionable smart monitoring of error messages generated during repave microservice operations in order to reduce the number of human interventions required.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the ASMEM device 202 via broadband or cellular communication. Of course, these embodiments are merely exemplary and are not limiting or exhaustive.

Upon being started, the actionable smart monitoring of error messages module 302 executes a process for providing actionable smart monitoring of error messages generated during repave microservice operations in order to reduce the number of human interventions required. An exemplary process for providing actionable smart monitoring of error messages generated during repave microservice operations in order to reduce the number of human interventions required is generally indicated at flowchart 400 in FIG. 4.

Figure 4:
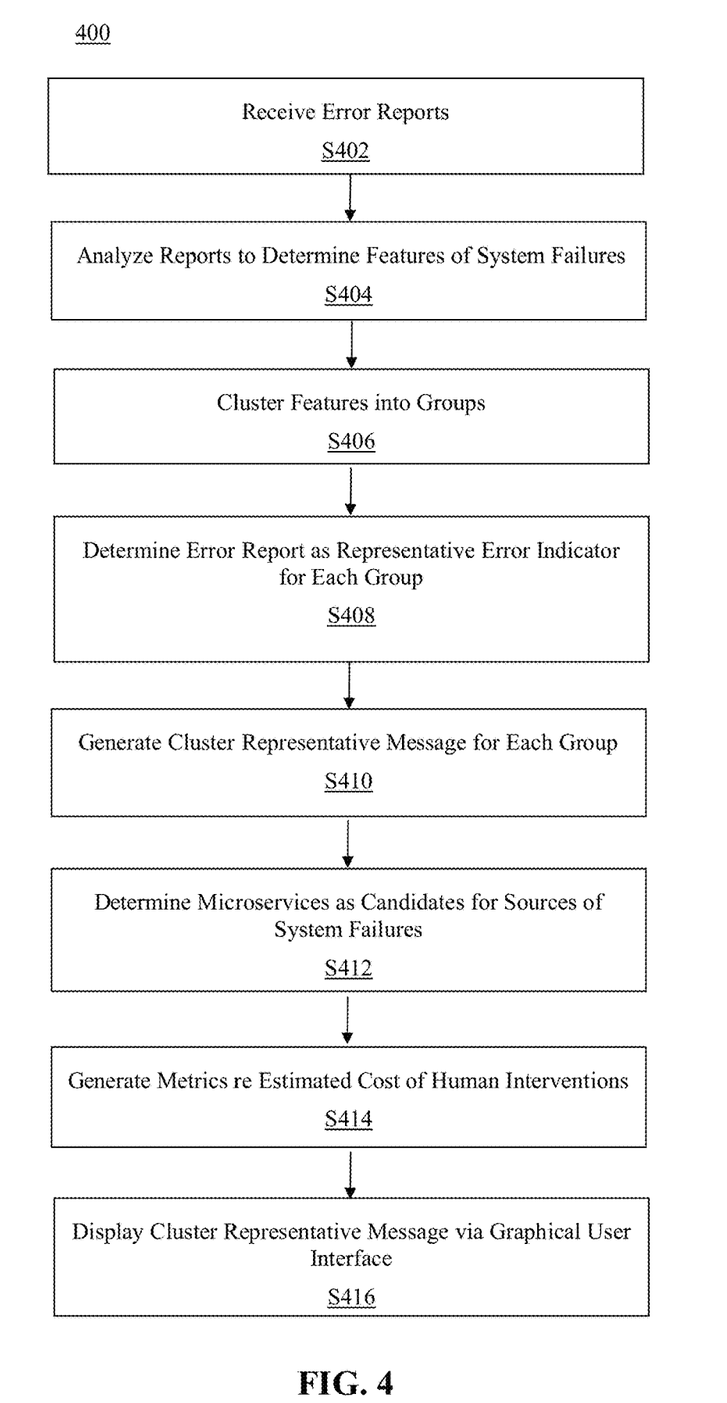
FIG. 4 is a flowchart of an exemplary process for implementing a method for providing actionable smart monitoring of error messages generated during repave microservice operations in order to reduce the number of human interventions required.

In process 400 of FIG. 4, at step S402, the actionable smart monitoring of error messages module 302 receives error reports that are generated as a result of system failures that occur within a software suite. In an exemplary embodiment, for large software suites, many error reports are generated on a regular basis; for example, the number of error reports that are generated on a daily or weekly basis may be in the hundreds or thousands.

At step S404, the actionable smart monitoring of error messages module 302 analyzes each report in order to determine features that relate to the system failures. In an exemplary embodiment, the analysis of the reports may be performed by applying a Latent Dirichlet Allocation (LDA) technique to each report in order to extract the features.

At step S406, the actionable smart monitoring of error messages module 302 clusters the features into groups. In an exemplary embodiment, the clustering of features into feature groups is performed on the basis of similarities between the features, and as a result, each resulting feature group includes features that are relatively similar to one another.

In an exemplary embodiment, the clustering operation may be implemented by applying a clustering algorithm that uses a machine learning technique to assess the similarities therebetween and to assign each respective feature to a corresponding feature group based on the assessed similarities. In an exemplary embodiment, the clustering algorithm may include a Gaussian Mixture Model (GMM). The clustering algorithm may be trained by using historical information that relates to a set of system failures, and the clustering algorithm may be retrained on a periodic basis by using subsequent sets of system failures that occur after the original set of system failures, in order to ensure that the clustering algorithm is always adapting to recent trends re errors and system failures.

At step S408, the actionable smart monitoring of error messages module 302 determines an error report as being a representative error indicator with respect to a particular feature group. In this aspect, the determinations of representative error indicators are performed on a group-specific basis. Then, at step S410, the actionable smart monitoring of error messages module 302 generates a cluster representative message for each feature group, and this message may then be transmitted to a predetermined destination in order to alert appropriate users. In an exemplary embodiment, the determination of the error report as being the representative error indicator for a particular feature group is performed by calculating a matrix of Levenshtein distances among features included in the particular feature group, and then selecting the report from among the reports received in step S402 based on the matrix.

At step S412, the actionable smart monitoring of error messages module 302 determines which microservices are candidates as being sources of system failures. In an exemplary embodiment, for any particular error report, the actionable smart monitoring of error messages module 302 may determine an event sequence that is associated with the system failure that is the subject of the particular error report, and then use the determination of the event sequence to determine which microservices may have caused that system failure. Then, at step S414, the actionable smart monitoring of error messages module 302 generates metrics that include information about the estimated cost of a human intervention that would be required to remedy the microservice that is deemed to have potentially caused a particular system failure. By making determinations about event sequences and candidate microservices as potential sources of system failures, the actionable smart monitoring of error messages module 302 may assist a user in diagnosing which microservices are most likely in need of such remedies and which are less likely to require interventions.

At step S416, the actionable smart monitoring of error messages module 302 displays a cluster representative message on a user display via a graphical user interface (GUI). In an exemplary embodiment, the GUI may be configured so that a user can select which cluster representative messages to view, and each message may be accompanied by other information that relates to the particular feature group with which the cluster representative message is associated, such as, for example, any statistics or metrics that relate to the particular feature group. In this manner, the user of the GUI is provided with useful information that will expedite the user's ability to address problems that are causing system errors and failures without needing to review hundreds of error reports to arrive at similar conclusions.

Figure 5:
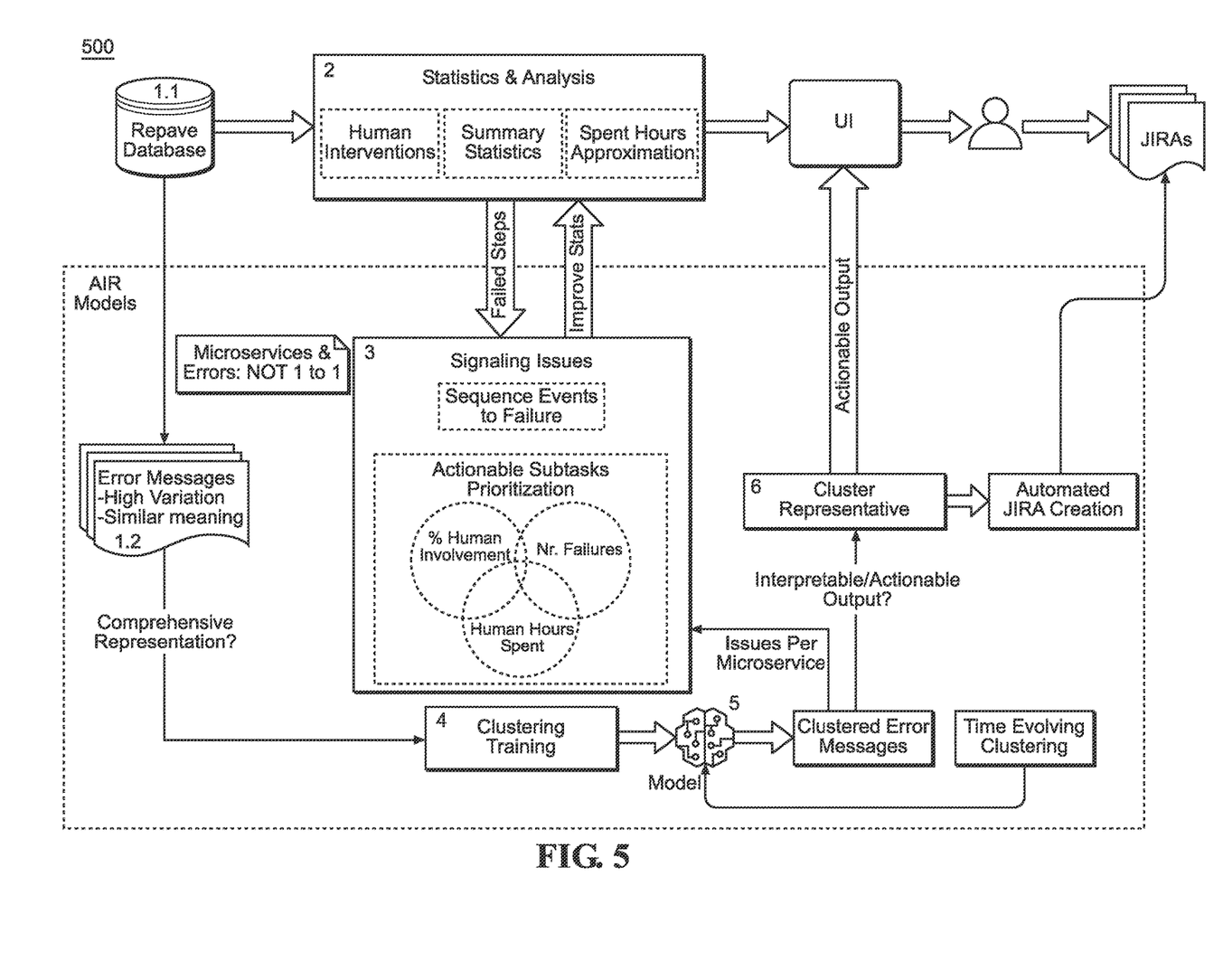
FIG. 5 is a system data flow diagram that illustrates an execution of a method for providing actionable smart monitoring of error messages generated during repave microservice operations in order to reduce the number of human interventions required, according to an exemplary embodiment.

FIG. 5 is a system data flow diagram 500 that illustrates an execution of a method for providing actionable smart monitoring of error messages generated during repave microservice operations in order to reduce the number of human interventions required, according to an exemplary embodiment. With respect to data flow diagram 500, the term "repave playbook" and/or "repave" refers to a high level task which includes multiple steps and/or subtasks. For example, a "database repave" may include a "create database" subtask and a "deploy Structured Query Language (SQL) database" subtask. A "subtask" refers to a single step in the repave playbook. A "path" refers to an identifier for a step, and represents the relative path to a file which stores the code for executing a playbook.

As illustrated in FIG. 5, in an exemplary embodiment, a process flow includes the following operations: 1) Data is queried from the internal repave database. In an exemplary embodiment, data is retrieved for each report generation, and data is also retrieved on a periodic basis, e.g. monthly, for training the models. 2) The "Statistics & Analysis" module feeds information on failures to the user interface (UI). 3) The "Signaling Issues" module highlights the most failed microservice paths. 4) Error messages are fed to the "Clustering Training" module, which generates a clustering model. In an exemplary embodiment, the model requires periodic retraining, as errors are remedied and distribution of data changes. 5) The model makes predictions on new data every time a report is generated. 6) Errors are aggregated by cluster, and a cluster representative message is fed to the UI.

Statistics and Analysis module: Data is processed to give an overview of the failure and an approximate impact on the cost. In an exemplary embodiment, within the Statistics and Analysis module, there are three main subprocesses: 1) Human Interventions: This metric helps to separate the tasks in which a human was involved against the fully automated steps. A determination may be made as to whether the initiator was a human by querying the phone book and using the session identifier (SID). 2) Summary Statistics: The scope of this module is to provide an overview on the failed numbers, based on monitoring that has been performed historically, in order to provide an estimate on impact and a validation on the data used for modeling. 3) Spent Hours Approximation: This heuristic estimates the cost of human interventions in failed runs of the applications. In an exemplary embodiment, all of the computed numbers are fed into the UI for constant monitoring.

Signaling Issues module: In an exemplary embodiment, in addition to determining an estimated cost resulting from a system failure, more details are required to understand the root cause of the error. The Signaling Issues component is designed to examine the sequences of events which lead to failure. Each task is generated by a microservice which is represented using the path, i.e., a sequence of steps that are executed by using microservices.

Prioritization: In an exemplary embodiment, the Signaling Issues module is also designed to examine the paths which fail most often, in order to generate an actionable feedback. The criteria used include the following: 1) percentage of human intervention; 2) number of failures; and 3) human hours spent. The microservices that are most urgently in need of further investigation may be selected by taking the intersection of these criteria.

Clustering training: After the microservices that are deemed as being the most likely sources of system failures are identified, another object is to gain additional insight into the types of errors which occur. The main issue is that a microservice can give rise to different types of errors, which may in turn require multiple fixes. The raw error messages contain highly variable data, but the underlying meaning of errors is low.

In an exemplary embodiment, the error messages are clustered in order to obtain an overview of the common issues. After pre-processing the data, features that are associated with the error messages are obtained by using Latent Diricleth Allocation (LDA). To optimize the representation of the features, a hyperparameter search is performed, and the parameters with the highest coherence score are used. The next step is to cluster the features by the topics obtained through LDA. In an exemplary embodiment, Gaussian Mixture Models (GMM) are used together with the LDA features to cluster the feature in a manner that yields positive results. In an exemplary embodiment, the clustering success is quantified with the Silhouette score, which is also used for the hyperparameter search.

In an exemplary embodiment, the model is trained on a monthly basis as the distribution of error messages changes. The changes happen because after the most common root causes are identified, those are fixed, but new issues may appear as well. In an exemplary embodiment, an adjustable clustering model, which considers previously predicted data, may also be employed by incorporating the previously predicted data in a Gaussian Mixture Model (GMM) and with a Kalman filter.

Clustering Representation: This system component is designed to assign meanings to clusters. In their raw form, clusters are just categorical variables with no interpretation. In order to generate an actionable output, an error message which best represents the cluster is identified. In an exemplary embodiment, this is performed by computing a matrix of Levenshtein distances between all the elements in the cluster. Then the mean of this score is computed for each element in the cluster, and the error with minimum value is taken. This error is then passed to the UI, thereby enabling a user to generate a Jira report. In an exemplary embodiment, the Jira report may be generated automatically upon receipt of any update by the UI.

Accordingly, with this technology, an optimized process for providing actionable smart monitoring of error messages generated during repave microservice operations in order to reduce the number of human interventions required is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for monitoring system failures, the method being implemented by at least one processor, the method comprising:
   receiving, by the at least one processor, a plurality of reports that relate to system failures;
   analyzing, by the at least one processor, each report from among the plurality of reports to determine a plurality of features that relate to the system failures;
   clustering, by the at least one processor, the plurality of features into a set of feature groups;
   determining, by the at least one processor for each respective feature group, a corresponding report from among the plurality of reports as a representative error indicator for the respective feature group; and
   generating, by the at least one processor for each respective feature group, a corresponding cluster representative message that identifies the corresponding report, and transmitting the corresponding cluster representative message to a predetermined destination,
   wherein the analyzing comprises applying a Latent Dirichlet Allocation (LDA) technique to each report in order to determine the plurality of features, and
   wherein the clustering comprises applying a clustering algorithm that implements a machine learning technique to assess similarities among the plurality of features and to assign each respective feature to a corresponding feature group based on the assessed similarities, and
   wherein the clustering algorithm is trained by using historical information that relates to a first set of system failures, and
   wherein the clustering algorithm is periodically retrained by using additional historical information that relates to a subsequent set of system failures that occur after the first set of system failures.

2. The method of claim 1, wherein the clustering algorithm includes a Gaussian Mixture Model (GMM).

3. The method of claim 1, wherein the determining of the corresponding report as the representative error indicator for the respective feature group comprises:
   calculating a matrix of Levenshtein distances among features included in the respective feature group; and
   selecting the corresponding report based on the calculated matrix.

4. The method of claim 1, wherein the transmitting of the corresponding cluster representative message to the predetermined destination comprises displaying the corresponding cluster representative message via a graphical user interface (GUI).

5. The method of claim 4, further comprising:
   determining at least one event sequence associated with a particular system failure associated with at least one report from among the plurality of reports;
   determining, based on the at least one event sequence, at least one microservice as a candidate for being a source of the particular system failure; and
   generating at least one metric that includes information that relates to an estimated cost of a human intervention associated with the at least one microservice.

6. The method of claim 5, further comprising displaying the at least one metric via the GUI.

7. A computing apparatus for monitoring system failures, the computing apparatus comprising:
   a processor;
   a memory;
   a display; and
   a communication interface coupled to each of the processor, the memory, and the display,
   wherein the processor is configured to:
      receive, via the communication interface, a plurality of reports that relate to system failures;
      analyze each report from among the plurality of reports to determine a plurality of features that relate to the system failures;
      cluster the plurality of features into a set of feature groups;
      determine, for each respective feature group, a corresponding report from among the plurality of reports as a representative error indicator for the respective feature group; and
      generate, for each respective feature group, a corresponding cluster representative message that identifies the corresponding report, and transmit the corresponding cluster representative message via the communication interface to a predetermined destination, wherein the processor is further configured to apply a Latent Dirichlet Allocation (LDA) technique to each report in order to determine the plurality of features, and wherein the processor is further configured to perform the clustering by applying a clustering algorithm that implements a machine learning technique to assess similarities among the plurality of features and to assign each respective feature to a corresponding feature group based on the assessed similarities, and wherein the clustering algorithm is trained by using historical information that relates to a first set of system failures, and wherein the clustering algorithm is periodically retrained by using additional historical information that relates to a subsequent set of system failures that occur after the first set of system failures.

8. The computing apparatus of claim 7, wherein the clustering algorithm includes a Gaussian Mixture Model (GMM).

9. The computing apparatus of claim 7, wherein the processor is further configured to perform the determination of the corresponding report as the representative error indicator for the respective feature group by:

calculating a matrix of Levenshtein distances among features included in the respective feature group; and selecting the corresponding report based on the calculated matrix.

10. The computing apparatus of claim 7, wherein the processor is further configured to cause the display to display the corresponding cluster representative message via a graphical user interface (GUI).

11. The computing apparatus of claim 10, wherein the processor is further configured to:

determine at least one event sequence associated with a particular system failure associated with at least one report from among the plurality of reports;

determine, based on the at least one event sequence, at least one microservice as a candidate for being a source of the particular system failure; and generate at least one metric that includes information that relates to an estimated cost of a human intervention associated with the at least one microservice.

12. The computing apparatus of claim 11, wherein the processor is further configured to cause the display to display the at least one metric via the GUI.

13. A non-transitory computer readable storage medium storing instructions for monitoring system failures, the storage medium comprising executable code which, when executed by a processor, causes the processor to:

receive a plurality of reports that relate to system failures;

analyze each report from among the plurality of reports to determine a plurality of features that relate to the system failures;

cluster the plurality of features into a set of feature groups;

determine, for each respective feature group, a corresponding report from among the plurality of reports as a representative error indicator for the respective feature group; and generate, for each respective feature group, a corresponding cluster representative message that identifies the corresponding report, and transmit the corresponding cluster representative message to a predetermined destination, wherein, when executed by the processor, the executable code further causes the processor to perform the analysis by applying a Latent Dirichlet Allocation (LDA) technique to each report in order to determine the plurality of features, and wherein, when executed by the processor, the executable code further causes the processor to perform the clustering by applying a clustering algorithm that implements a machine learning technique to assess similarities among the plurality of features and to assign each respective feature to a corresponding feature group based on the assessed similarities, and wherein the clustering algorithm is trained by using historical information that relates to a first set of system failures, and wherein the clustering algorithm is periodically retrained by using additional historical information that relates to a subsequent set of system failures that occur after the first set of system failures.

* * * * *